United States Patent [19]

Neumann et al.

[11] Patent Number: 4,636,139
[45] Date of Patent: Jan. 13, 1987

[54] METHOD FOR BUNDLE STACKING

[75] Inventors: Irving H. Neumann, Somerville; Walter J. Stobb, Pittstown; Robert M. Silva, Milford; Klaus A. Thumm, Phillipsburg, all of N.J.

[73] Assignee: Stobb Inc., Clinton, N.J.

[21] Appl. No.: 710,502

[22] Filed: Mar. 11, 1985

[51] Int. Cl.⁴ .................. B65G 57/22; B65G 57/10
[52] U.S. Cl. ..................... 414/786; 414/56; 414/57; 414/62; 414/65
[58] Field of Search ............... 198/422, 378; 414/54, 414/55, 56, 57, 59, 62, 65, 41, 786, 110; 53/540, 543, 544

[56] References Cited

U.S. PATENT DOCUMENTS

| | | | |
|---|---|---|---|
| 2,822,932 | 2/1958 | Patrick | 53/540 X |
| 3,675,790 | 7/1972 | Avril | 414/65 |
| 4,419,035 | 12/1983 | Stobb | 414/71 |
| 4,427,329 | 1/1984 | Milholen | 414/57 X |

FOREIGN PATENT DOCUMENTS 0131363  6/1978  German Democratic Rep. ... 414/62
0131364  6/1978  German Democratic Rep. ... 414/65

Primary Examiner—Robert J. Spar
Assistant Examiner—Janice Krizek
Attorney, Agent, or Firm—Arthur J. Hansmann

[57] ABSTRACT

Apparatus and method for stacking bundles of sheets onto a table top or the like, and with the bundles being stacked in an interlocked manner where, in all layers of the bundles, the bundles have right angled relationships with each other, for sturdy and secure positioning of the bundles in the stack. A rotatable table is utilized for supporting the bundles, and a transport or carrier, such as an overhead crane, is utilized for bringing the bundles onto the table where, after a few bundles are placed thereon, the table is rotated and displaced and additional bundles are then placed onto the table for the interlocked relationship of all of the bundles.

4 Claims, 5 Drawing Figures

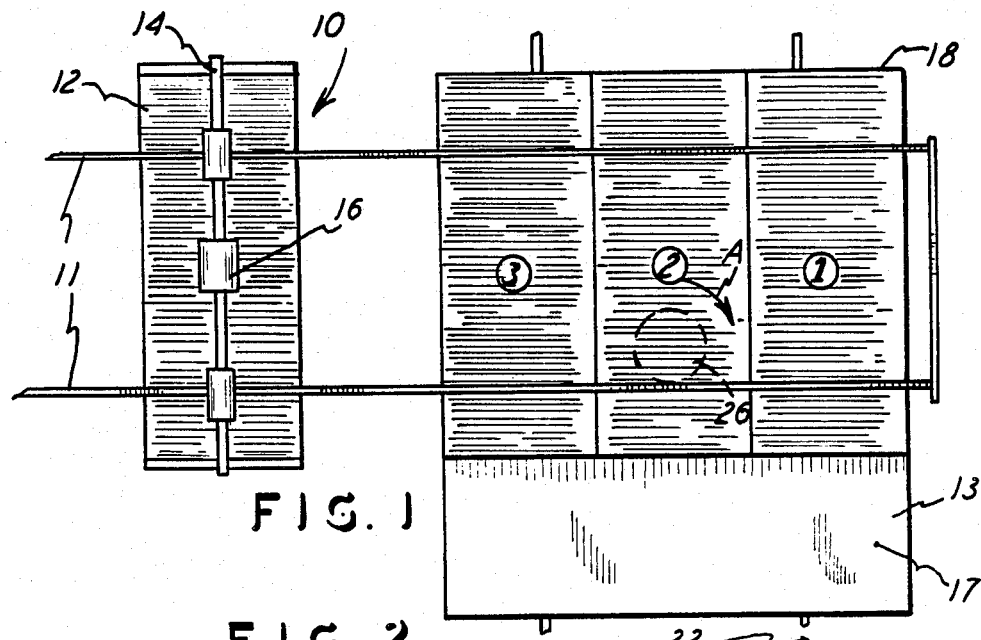
FIG. 1
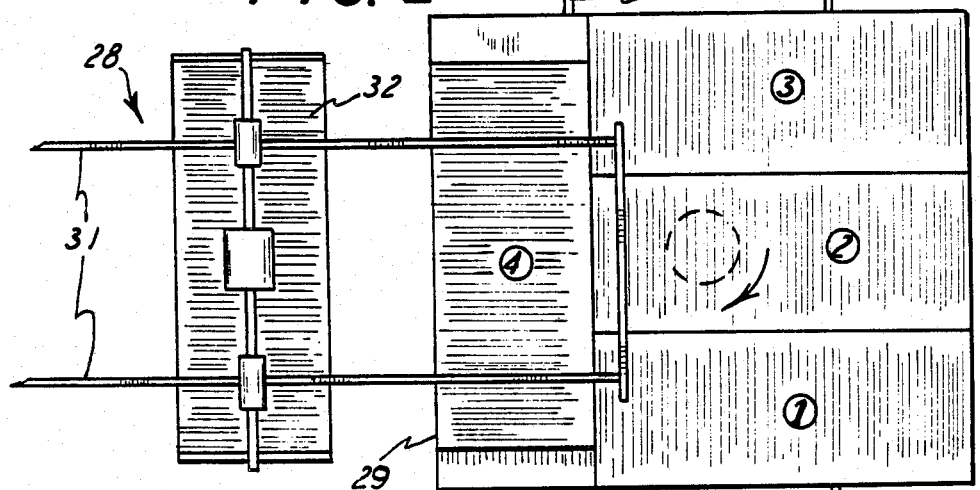
FIG. 2
FIG. 3

METHOD FOR BUNDLE STACKING

This invention relates to a method and apparatus for stacking bundles of sheets, and, more particularly, it relates to a method and apparatus for stacking bundles of sheets on a table top or the like in an interlocked secure relationship.

BACKGROUND OF THE INVENTION

The graphic arts industry is concerned with the matter of handling bundles of sheets, such as those coming from a conventional type of sheet stacker and with the sheets being bound into individual bundles of elongated shape, and stacking those bundles onto a horizontal surface, such as a pallet or table top or the like. U.S. Pat. No. 4,419,035, for instance, shows a method and apparatus utilizing an overhead crane for transporting bundles of sheets to a single location where the sheets are deposited onto a pallet. In that example, the bundles are all positioned in the same orientation, that is, with their longitudinal axis all being parallel and with the bundles being in side-by-side relationship and stacked upon each other to form various layers.

The present invention differs from the known prior art in that it provides a method and apparatus for stacking bundles in an interlocked relationship whereby the various bundles are stacked at two different orientations. That is, the longitudinal axis of some of the bundles are in one direction, and the longitudinal axis of others of the bundles are in a direction at right angles thereto. In that manner, the bundles are in an interlocked relationship and are therefore secure and sturdy in the stack and can be transported without having the bundles fall from a truck or other transport mechanism.

Still further, the apparatus and method of this invention provides for stacking the bundles in the secure relationship mentioned and to also provide for ready removal or unstacking, all in a convenient and efficient manner and in an automated system. Therefore, the bundles are neatly and quickly stacked in an automated manner, and they can also be quickly removed from the stack in automated manner.

Still further, the present invention provides apparatus and method for stacking bundles in a secure fashion and doing so in a manner which utilizes several transport mechanisms, such as a bundle transport overhead crane, so that the bundles can be stacked quickly and efficiently by the use of the several cranes or the like forming the bundles into one collection of several layers of the bundles.

It is also significant and important in this invention that the bundles can be unloaded from a pallet or table top or the like in an efficient and quick manner, in reverse procedure from the stacking or loading process.

In summary, the sheets, such as folded printed sheets of the graphic arts industry, are stacked and tied into bundles which are transported, such as by overhead cranes, to stacking stations where the bundles are laid in two different orientations in each layer of bundles, so that the stacked bundles are in a compact and secure stack.

BRIEF DESCRIPTION OF THE DRAWINGS

FIG. 1 is a top plan view of the apparatus of this invention and showing three bundles in side-by-side relationship on a table top or the like.

FIG. 2 is a top plan view at a second station and showing a fourth bundle positioned on the table top.

FIG. 3 is a top plan view at a third station and showing the next layer of three bundles positioned on the first four bundles or lower layer.

DETAILED DESCRIPTION OF THE PREFERRED METHOD AND APPARATUS

Figure 4:
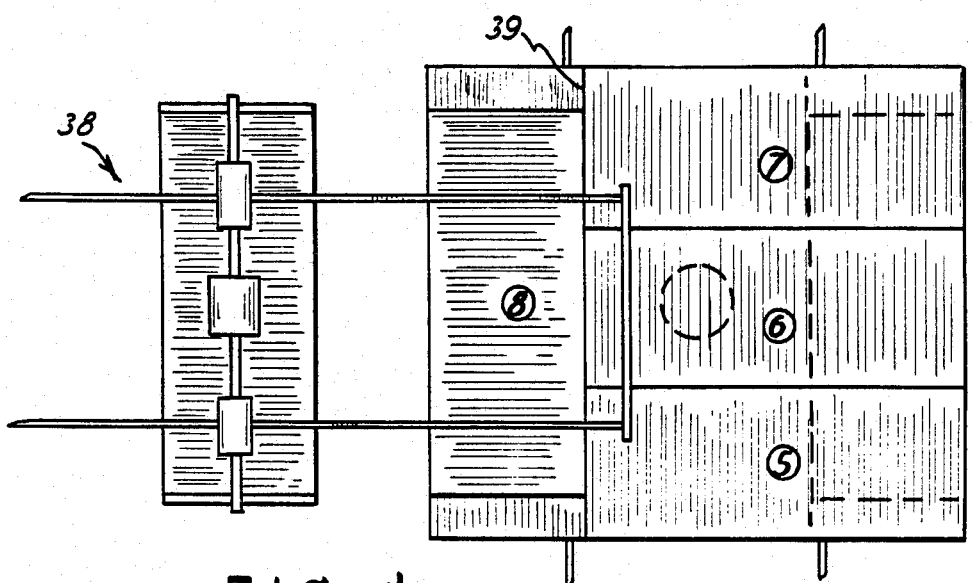
FIG. 4 is a top plan view of a fourth station and showing an eighth bundle positioned on the second layer.

FIG. 1 shows a first station where an overhead crane 10 operates along an overhead suspension or track 11 to carry bundles, such as the bundle 12, to the right, as viewed in FIG. 1, and deposit the bundles onto a table 13. Of course the table 13 can be down at a floor level, while the overhead crane 10 is elevated in a plant or the like, and it carries the bundles from a stacker which is unshown and deposits the bundles one by one onto the rectangularly shown table 13, for instance. The crane 10 includes a suitable bundle clamp 14 which holds the bundles 12 in the overhead position, and appropriate powered mechanism, such as an indicated motor 16 can be utilized for moving the clamp 14 with the bundle 12 along the suspension members 11. That arrangement of an overhead crane can be as shown in U.S. Pat. No. 4,419,035, for instance, and it will there be seen that the crane has a clamp for picking up a bundle and transporting the bundles, one by one to a stacking position shown therein.

The table 13 is shown to be of a shape having an elongated rectangular upper surface 17, and three bundles designated 1, 2, and 3 are shown already positioned on the table 13, but to one side thereof, that is adjacent the table edge 18. The longitudinal orientation of the three bundles 1, 2, and 3 is parallel, and the bundles are in side-by-side and abutting relationship as shown, and their ends over the exposed table surface 17 are shown aligned with one vertical plane.

Figure 5:
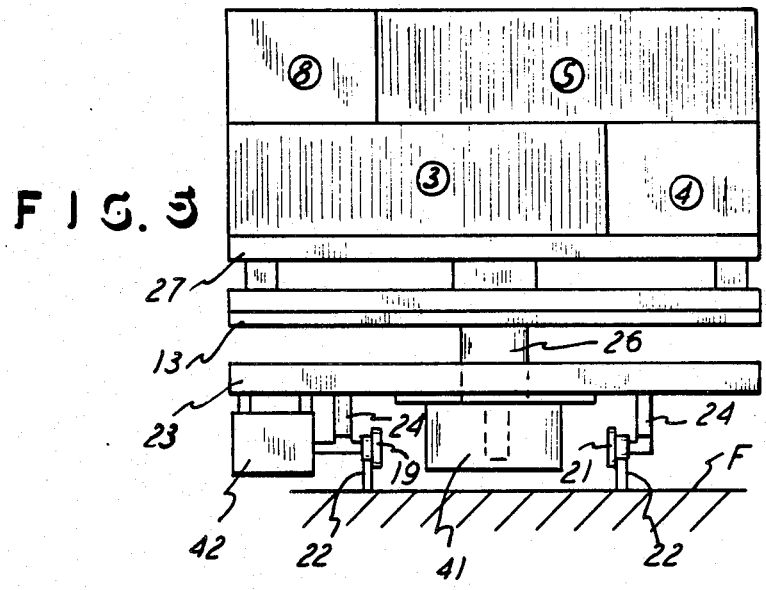
FIG. 5 is an end elevational view of FIG. 4.

The table can be supported on wheels 19 and 21, such as shown in FIG. 5, and the wheels 19 and 21 can be guided on two parallel tracks 22 suitably supported on the floor designated F. FIG. 5 also shows that the wheels 19 and 21 suitably support the table 13 which can include a lower frame or plate 23 directly connected through legs 24 to the wheels 19 and 21, for instance. A rotatable post 26 extends on a vertical rotation axis and suitably supports the upper table top 13 which is therefore rotatable about the vertical axis of the upright 26. Therefore, the table top 13 can rotate in a 360 degree or full rotation, and it can be rotated in the clockwise direction, such as shown by the arrows designated A in FIGS. 1, 2, and 3. FIG. 5 also shows a conventional pallet 27 which may or may not be supported on the table top 13 and which in turn would therefore support the bundles shown thereon. However, as mentioned, the pallet 27 need not be utilized but is optional.

After bundles 1, 2, and 3 have been positioned as shown in FIG. 1, then the table 13 can be moved along the track 22 to the second station which is shown in FIG. 2. At that station, another overhead crane, now designated 28, aligns with the table 13 which has been rotated 90 degrees clockwise, and a fourth bundle, numbered 4, is positioned onto the table top surface 17 but at a right angle to bundles 1, 2, and 3 and in abuttment therewith and overlapping all of those three bundles, as shown in FIG. 2. The bundle 4 thus can extend to the table top edge 29, as shown, and therefore virtually the entire table top surface 17 is covered with the four bundles. In the stacking shown, the four bundles form a first or lower layer of bundles in an interlocked relationship so that the bundles are now secure and therefore, for instance, bundles 1 and 3 will not tend to tip off the table 13 when the table 13 or the pallet 27 is moved. Therefore, the second station shown in FIG. 2 is located to have it aligned with the overhead conveyor 28 on the center line of the conveyor 28 which is operating on the overhead tracks 31 for carrying the bundles, such as the bundle designated 32 which is shown in the position where bundle 4 was previously located prior to being positioned on the table 13 in its FIG. 2 position.

Next, the table 13 moves to the FIG. 3 position which is the third station, and again the table is rotated 90 degrees so that it is now 180 degrees out of orientation from FIG. 1. At that third station, the one end of the table is in central alignment with a third crane designated 33 operating on parallel tracks 34 for individually and sequentially positioning bundles designated 5, 6, and 7 onto the top of the lower layer of four bundles, as shown. That is, again the overhead crane 33 carries bundles, such as the bundle 36, in alignment with the displaced and rotated table 13 for positioning the three bundles, 5, 6, and 7 on one side of the table for alignment generally with the table edge 37. It will also be noted that the alignment of bundles 5, 6, and 7 is in the same general orientation as the alignment of the three bundles 1, 2, and 3, and the bundles 5, 6, and 7 also rest upon the upper surface of the lower bundle 4 which is therefore held in a sturdy and secure position and will not tip off the table top.

Finally, the table is again rotated and displaced and moved to the fourth station which is shown in FIG. 4 where the table aligns with an overhead conveyor 38 which positions bundle number 8 onto the ends of the exposed bundles, 1, 2, and 3. The bundle 8 is also in contact with the edges of the bundles 5, 6, and 7 as designated by the line 39 in FIG. 4.

In that manner, four bundles are placed in each of the two layers described, and they are in the interlocked relationship so that they are sturdy and secure and will not tip off the table top though the table top is no larger than the overall vertical projection of the bundles and therefore is no larger than required and will not occupy excessive floor space. FIG. 5 shows the two layers of bundles for a further display of the interlocking relationship of the bundles of sheets. It of course will be understood that the individual bundles are elongated and have a longitudinal axis extending between their opposite ends, and they are tied or strapped by a strap which is not shown in the drawing, but which is conventional in binding bundles of otherwise loose sheets.

For unloading the bundles from the table 13 or the transported pallet 27, overhead cranes or any operated clamps can be utilized for unloading in the reverse order of loading. That is, the unloading can commence at station 4 and progress backwards through stations 3, 2, and 1. In loading and unloading it is seen that the opposite ends of each bundle are clear of any object when that bundle is on the table and it is time to handle that bundle, to thereby accomodate the bundle holder 14.

FIG. 5 shows a motor 41 connected with the rotatably mounted post 26 for rotating the post 26, such as through the 90 degree clockwise intervals of rotation described. Also, a motor 42 is shown and can be connected with the wheels 19 for driving the table along the tracks 22, as mentioned. The motors 41 and 42 can be electrically or otherwise interconnected to be operated in appropriate manners and timing for the purpose of progressing through the four stations described herein. The post 26 is shown to be central relative to the table 13, and the conveyors 10 and 33 are shown offset relative to the center of the table 13, all for the purposes described herein. Both the method and apparatus has been described in the foregoing.

What is claimed is:

1. A method of stacking elongated bundles of sheets onto a table in an interlocking relationship, and with each of said bundles having a longitudinal axis, comprising the steps of rotatably supporting a table in a horizontal orientation for rotation about a vertical axis and at a first station, positioning a first several said bundles of sheets on said table offset thereon to one side thereof and in side-by-side and parallel axes relationship with the ends of said bundles aligned in a vertical plane, rotating said table about said vertical axis and horizontally moving said table to a second station, positioning an additional one of said bundles of sheets on said table in a position to extend adjacent said vertical plane and across said ends of said first several bundles of sheets at said second station and with said axis of said additional one bundle being transverse to said axes of said first several bundles to thereby form a first layer of bundles of sheets, rotating said table about said vertical axis and horizontally moving said table to a third station, positioning another several bundles of sheets on top of said additional one of said bundles of sheets and on said first several bundles of sheets with said axes of said another several bundles being parallel to said axes of said first several bundles, rotating said table about said vertical axis and horizontally moving said table to a fourth station, and positioning another additional one of said bundles of sheets on top of said first several bundles of sheets and with its said axis transverse to said axes of said first several bundles to thereby form a second layer of bundles of sheets.

2. The method of stacking bundles of sheets onto a table in an interlocking relationship as claimed in claim 1, including the step of positioning all the bundles of sheets by means of overhead-type bundle-carrying cranes each of which moves relative to respective ones of said stations and relative to the same side of said stations, and movably positioning a respective one of said cranes at each of said stations.

3. The method of stacking bundles of sheets onto a table in an interlocking relationship as claimed in claim 1, wherein each said rotating of said table is in an amount of a 90 degree rotation.

4. The method of stacking bundles of sheets onto a table in an interlocking relationship as claimed in claim 1, wherein each of said bundles has two opposite ends at the longitudinal limits thereof and said bundles are positioned on said table with said opposite ends of each of said bundles clear of any object on said table at the time each of said bundles is placed onto said table, to thereby accommodate an unobstructed bundle holder in contact with said opposite ends.

* * * * *